United States Patent [19]
Andrews

[11] B 3,981,786
[45] Sept. 21, 1976

[54] ECM AND EDM TOOLING FOR PRODUCING HOLES IN AIRFOIL TRAILING EDGES

[75] Inventor: Laurance R. Andrews, Agawam, Mass.

[73] Assignee: United Technologies Corporation, Hartford, Conn.

[22] Filed: Dec. 19, 1974

[21] Appl. No.: 534,314

[44] Published under the second Trial Voluntary Protest Program on February 10, 1976 as document No. B 534,314.

[52] U.S. Cl............................ 204/224 M; 219/69 E; 219/69 M
[51] Int. Cl.² ......................... C25F 7/00; B23K 9/24
[58] Field of Search ................. 204/224 M, 129.55; 219/69 E, 69 M

[56] References Cited
UNITED STATES PATENTS

| 3,801,489 | 4/1974 | Samson | 204/224 M X |
| 3,803,015 | 4/1974 | Andrews | 204/224 M |
| 3,842,480 | 10/1974 | Mikulski | 204/224 M X |

*Primary Examiner*—G. L. Kaplan
*Attorney, Agent, or Firm*—Charles A. Warren

[57] ABSTRACT

An electochemical drilling device in which the plurality of electrode tubes are guided into hole drilling position by guide elements, one for each tube, which are resiliently moved into engagement with the workpiece, thereby compensating for irregularities in the workpiece. These guides move generally substantially at right angles to the tubes and may have notches for engagement with opposite surfaces of the workpiece adjacent to the position of the holes to be drilled therein.

10 Claims, 7 Drawing Figures

ECM AND EDM TOOLING FOR PRODUCING HOLES IN AIRFOIL TRAILING EDGES

SUMMARY OF THE INVENTION

In multiple electrochemical drilling, there is always the problem of accurately locating the electrodes with respect to the workpiece so that all the holes are in the desired relation to one another. One arrangement to accomplish this is shown in Andrews U.S. Pat. No. 3,803,015, in which the electrodes are guided into engagement with the trailing edge of a turbine vane for drilling a row of cooling holes therein. In this patent, however, there is no compensation for varying thicknesses of the trailing edge of the vane or for a small amount of bowing in the vane. Workpieces of this type may meet design standards with a limited tolerance in trailing edge thickness or curvature, for example, but it is essential that the row of cooling holes be precisely located so as to extend through the trailing edge and into the hollow of the vane in order that all holes may function in the cooling process when the vanes are in use. Other types of workpiece may equally require a precise location of the individual electrode tubes if the multiple drilling operation is to produce the appropriate location of the drilled holes.

According to the present invention, the plurality of electrode tubes are individually moved with respect to one other for locating each tube with respect to a locating surface or surfaces on a workpiece so that the holes will be in precise relation to this locating surface. To accomplish this a plurality of slides carrying tube guides are individually and parallely movable substantially at a right angle to the tubes so that each tube is individually positioned, the slides being all resiliently urged into engagement with the locating surface on the workpiece. In this way the tolerance variations from the normal in the workpiece may be corrected for and the drilled holes will all be in the proper location in the workpiece.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
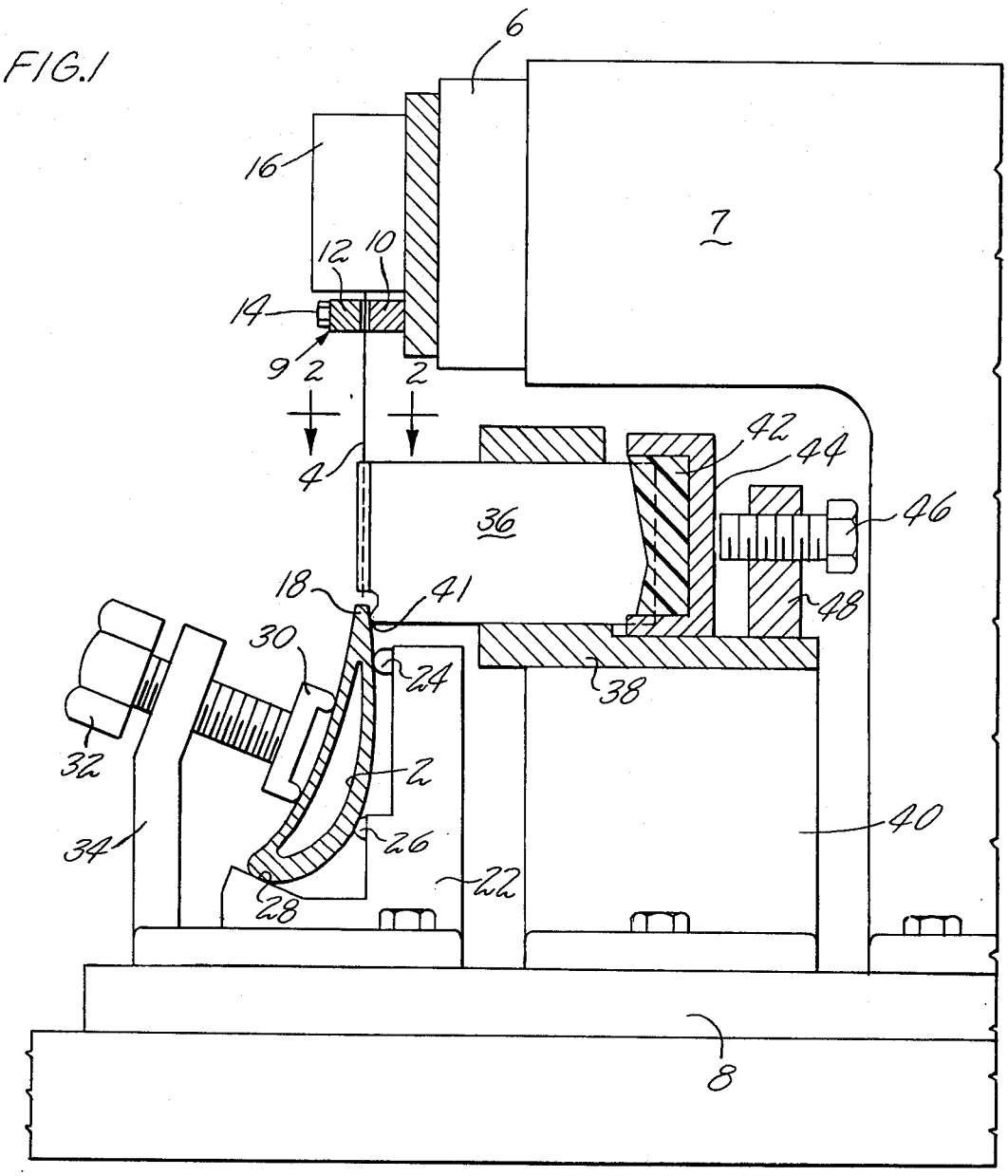
FIG. 1 is an elevation of an electrochemical drilling machine.

The machine shown is similar to the electrochemical drilling machine of the Andrews Pat. No. 3,803,015, above referred to. As shown, the workpiece 2 is mounted in a position to be engaged by a plurality of electrode tubes 4 supported by a slide 6 on an upright 7 on the base 8 of the machine by a clamping structure 9. This may include a block 10 on the slide and a cooperating block 12 clamped against block 10 as by clamping bolts 14. Above this clamp is a chamber 16 into which the ends of the electrode tubes extend and which supplies electrolyte to the tubes as in the above mentioned patent.

The workpiece 2 is shown, by way of example, as a hollow turbine vane with a trailing edge 18 into which the plurality of holes are to be drilled. The workpiece may be held in position on the machine base 8 by a fixture 22 including two axially spaced work engaging surfaces 24, only one of which is shown, and another chordwise spaced contact 26. These surfaces are in contact with the convex portion of the turbine vane, the surfaces 24 being near the trailing edge as shown. The vane is held against these surfaces and against two axially spaced surfaces 28, only one being shown, close to the leading edge of the vane by a movable clamping element 30 engaging the concave surface of the turbine vane. This element may be urged against the vane by a clamping screw 32 carrying the element 30 and positioned in a bracket 34 on the fixture 22. In this way successively drilled workpieces are positioned in and removed from the machine, being held, when in the machine, in precise relation to the tubes and the slide carrying the tubes.

Figure 2:
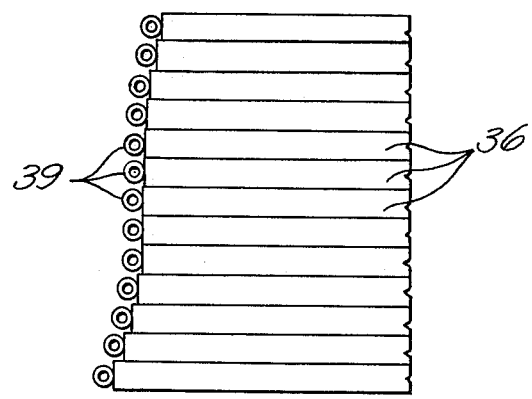
FIG. 2 is an enlarged plan view of the guide carrying slides.

Between the slide 6 and the workpiece the several electrode tubes are guided by a plurality of slides 36, placed side by side in a fixed guide 38 secured to an upright 40 on the machine base. Each slide guides one tube and as shown in FIG. 2, each guide has a sleeve 39 on the one surface to receive the associated tube, there being one slide for each tube. Each slide has, at a point close to the end of the sleeve thereon, a work engaging detent 41 that engages the turbine vane at a point close to the trailing edge and on the convex side of the vane.

Figure 3:
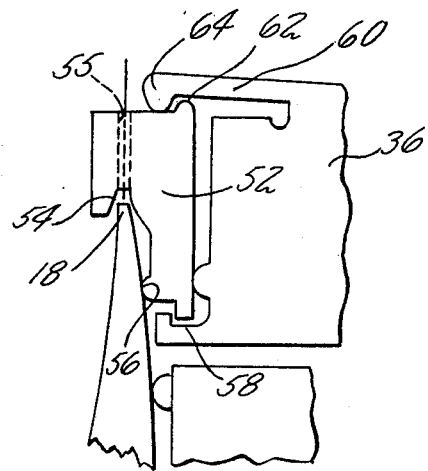
FIG. 3 is an elevation, on a larger scale than FIG. 1, of a modified form of slide.
Figure 4:
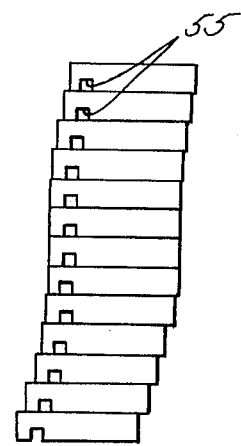
FIG. 4 is an enlarged plan view of the ends of the slides of FIG. 3.
Figure 7:
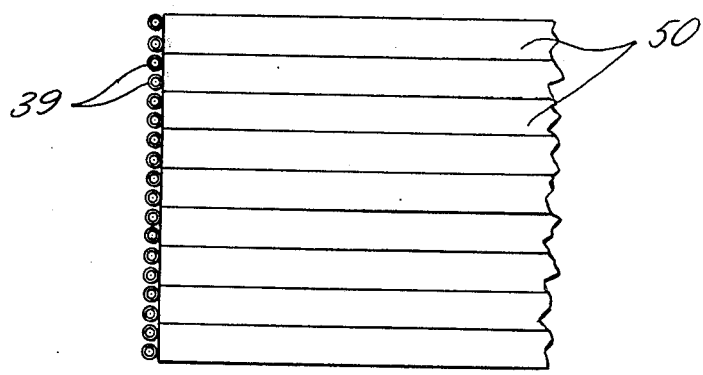
FIG. 7 is a view similar to FIG. 2 of a modification.

At the opposite end of each slide a rubber block 42 engages the ends of the slides and urges them individually resiliently to the left into contact with the workpiece. The block 42 is backed up by a support 44, the latter being held in operative position by a clamping bolt 46 in a post 48, by which the resilient pressure on the slides may be adjusted. It will be obvious that when the workpiece is in position and with the slides in engagement with the workpiece near the trailing edge all the electrode tubes will be in a position for engaging the trailing edge even if there may be a lateral curvature in the trailing edge. In this way the holes will all enter midway of the trailing edge within the required tolerance and terminate at the hollow interior of the vane. Drilling is accomplished by applying an electrical current between the tubes and the workpiece and supplying electrolyte through the tubes from the electrolyte chamber.

Where the vane tolerances are not too great, the single slide for each electrode tube may be simplified, as shown in FIG. 7, by a smaller number of slides 50, each slide carrying a plurality of the guide sleeves 39'. Although not as precise as the mechanism of FIG. 2 it is adequate in many instances to give the desired correction but with a simpler compensating structure.

Where the thickness of the trailing edge is relatively thin or the size of the hole relatively large and has such a tolerance that the contact between the slides and only one side of the workpiece will not make an adequate correction, each slide may be modified to have a locating notch. As shown, in FIG. 3, each slide 36' carries a locating member 52 at the work engaging end, and this member has a notch 54 to extend over the trailing edge 18' of the vane. This notch is in alignment with a single guide groove 55 in one side surface of the member 52 as shown and this groove receives the associated electrode tube and locates the electrode tube in said groove precisely midway of the trailing edge. The member 52 also has a detent 56 engaging the vane close to the trailing edge on the convex side. The member is clamped between a notch 58 formed at the base of the cooperating slide and a spring finger 60 extending from the slide and overlying the locating member. Cooperating detents 62 and 64 on the member and the finger retain the member in the recess provided for said member between the notch 58 and finger 60. Clearance around the member permits a freedom of movement for the member to pivot around the detent 56 and adjust to the configuration of the trailing edge.

Figure 5:
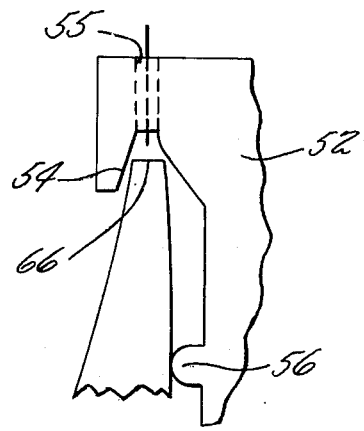
FIG. 5 is an enlarged view of the trailing edge and electrode locating means of FIGS. 3 and 4.
Figure 6:
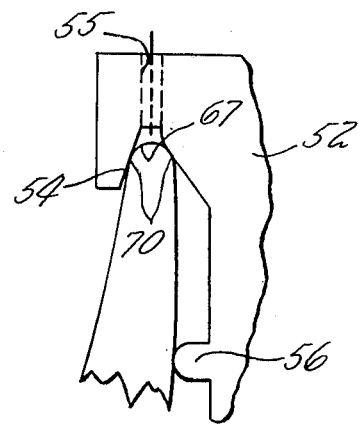
FIG. 6 is a view similar to FIG. 5 of a modification.

The trailing edge of the vane although relatively sharp is in fact a relatively flat surface 66, FIG. 5, or a sharply rounded surface 67 as in FIG. 6, preferably of a width slightly greater than the diameter of the holes to be drilled into this surface. The opposite side walls of the notch as shown have a greater angle of divergence than that of the opposite surfaces of the vane at the trailing edge. Thus the notch engages the vane at opposite edges of the surface 66 or at spaced points 70, FIG. 6, approximately where the rounded surface blends with the opposite surfaces of the vane.

When the vane is placed in position in the workholding fixture, the movement of the vane will move the trailing edge upwardly into the notches 54 before the clamp for the vane is adjusted. Thus the slides will be moved with respect to the resilient backing in such a manner that the notches will all be in engagement with opposite sides of the trailing edge and the tubes will be located precisely midway of the trailing edge in spite of variations in thickness permitted by tolerance allowances in the vane.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A device for supporting a plurality of electrode tubes for drilling a row of holes in a workpiece, said device including:
   a base,
   a locating fixture for a workpiece,
   a plurality of electrodes,
   a support for the electrodes movable toward and away from the fixture,
   a plurality of guides for the electrodes adjacent to the fixture,
   a plurality of movable slides in parallel arrangement, one for each guide and on which the respective guides are mounted,
   locating means on each slide having a surface engageable with a portion of the workpiece adjacent to the desired location of the hole therein, and
   resilient means acting on each slide in a direction substantially at right angles to the movement of the support for holding it against the workpiece with the electrode properly located relative to the workpiece.

2. A device as in claim 1 in which the slides are guided for movement substantially at right angles to the electrodes supported thereby and are adapted to engage the workpiece laterally with respect to the movement of the electrodes into the workpiece.

3. A device as in claim 1 in which the locating means is a notch in the slide alignment with the guide therein to engage over the trailing edge.

4. A drilling device including
   a plurality of electrode tubes for drilling a plurality of holes in a workpiece, and
   a workpiece holder for positioning a workpiece in a position to be engaged by said tubes,
   in combination with
   a plurality of parallely slidable guides, one receiving each electrode for positioning the electrode in proper relation to the workpiece,
   each guide having a workpiece engaging surface for locating the associated tube in position and
   means for urging all of said guides resiliently against the workpiece prior to the start of the drilling operation.

5. A device as in claim 4 including means for moving all of said electrodes as a unit relative to the workpiece holder for carrying said electrodes toward and against the workpiece, said electrodes being movable through said guides.

6. A device as in claim 5 in which the movement of the guides is substantially at right angles to the tubes.

7. A drilling device for drilling a plurality of holes at one time in a workpiece including
   a workpiece holder for holding a workpiece having a relatively sharp portion into which the holes are to be drilled in a position for the drilling operation,
   a plurality of electrode tubes movable as a unit toward the workpiece holder for performing the drilling operation,
   in combination with
   a plurality of slide elements, each having a guide thereon to receive an electrode tube for positioning the tubes relative to the holder in proper drilling position in relation to the sharp portion of the workpiece,
   each of said slide elements having a locating portion therein to engage the workpiece adjacent to said sharp portion, and
   means for guiding said elements for movement substantially at right angles to the tubes to permit said slide elements to position the locating portion in engagement with said sharp portion.

8. A device as in claim 7 including releasable clamping means on the workholder for holding the workpiece in position and for releasing the workpiece from the workholder.

9. A device as in claim 7 in which the locating portion is a notch fitting over the sharp portion of the workpiece and engaging on opposite sides thereof, and the guide on the slide is in alignment with the notch.

10. A device as in claim 7 in which each slide carries a plurality of guide elements and the locating portion on the slide serves to position the group of electrode tubes in said plurality of guide elements.

* * * * *